(12) United States Patent
Hibino

(10) Patent No.: US 7,764,582 B2
(45) Date of Patent: Jul. 27, 2010

(54) FOCUS SERVO APPARATUS

(75) Inventor: Kiyoshi Hibino, Gifu (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 756 days.

(21) Appl. No.: 11/276,783

(22) Filed: Mar. 14, 2006

(65) Prior Publication Data

US 2006/0209655 A1 Sep. 21, 2006

(30) Foreign Application Priority Data

Mar. 16, 2005 (JP) ............................. 2005-074827

(51) Int. Cl.
G11B 7/125 (2006.01)
G11B 7/00 (2006.01)
G11B 7/135 (2006.01)

(52) U.S. Cl. .................. 369/53.28; 369/112.24; 369/44.26

(58) Field of Classification Search ............... 369/53.28, 369/53.19, 44.16, 44.27, 53.22, 112.02, 112.24, 369/44.26
See application file for complete search history.

(56) References Cited

U.S. PATENT DOCUMENTS

| | | | | |
|---|---|---|---|---|
| 6,756,574 B2* | 6/2004 | Higuchi | ................... | 250/201.2 |
| 6,970,405 B2* | 11/2005 | Tateishi et al. | ........... | 369/44.32 |
| 7,277,365 B2* | 10/2007 | Yasuda et al. | ............ | 369/44.27 |
| 7,359,293 B2* | 4/2008 | Kanou et al. | ............. | 369/44.15 |
| 2002/0150016 A1* | 10/2002 | Yasuda et al. | ............ | 369/53.22 |
| 2004/0100879 A1* | 5/2004 | Ogasawara | .............. | 369/44.32 |
| 2004/0190423 A1* | 9/2004 | Yagi et al. | ..................... | 369/94 |
| 2004/0228232 A1* | 11/2004 | Takahashi et al. | ........ | 369/44.26 |

FOREIGN PATENT DOCUMENTS

| | | |
|---|---|---|
| JP | 2003-257069 | 9/2003 |
| JP | 2004-273023 | 9/2004 |

* cited by examiner

*Primary Examiner*—Wayne R Young
*Assistant Examiner*—Aneeta Yodichkas
(74) *Attorney, Agent, or Firm*—Fish & Richardson P.C.

(57) ABSTRACT

A focus servo apparatus which comprises an optical pickup having a power lens that changes an incidence angle of laser light incident on an objective lens and a power lens actuator that drives the power lens along an optical axis direction. In a focus search operation, the focus servo apparatus controls the power lens actuator to drive the power lens along the optical axis direction and detects having been brought into the focus servo area on the basis of a focus error signal obtained from photo-reception outputs from a photo-detector of the optical pickup, and then allows a focus servo to be in lock and returns the power lens to its initial position with driving the objective lens so as to maintain the lock state.

14 Claims, 4 Drawing Sheets

FOCUS SERVO APPARATUS

CROSS-REFERENCE TO RELATED APPLICATIONS

The present application claims priority from Japanese Patent Application No. 2005-74827 filed on Mar. 16, 2005, which is herein incorporated by reference.

BACKGROUND OF THE INVENTION

1. Field of the Invention

The present invention relates to a focus servo apparatus which performs a focus search operation of moving focus position of a light beam directed to a signal layer of a signal recording medium from an optical pickup along a focusing direction, thereby bringing the focus position into a focus servo area.

2. Description of the Related Art

For signal recording media such as optical discs which to optically reproduce and/or record a signal from and onto using laser light, new format optical disc standards such as the Blu-ray standard and the HD-DVD (High Density Digital Versatile Disc) standard have been proposed which are improved in recording density over DVD and CD that are current optical disc standards.

Due to the improvement in recording density, stricter requirements are imposed on optical characteristics of optical pickups for these optical disc standards having improved recording density in order to raise signal recording qualities, and an optical pickup is known which is provided with an aberration correction lens for correcting spherical aberration caused by its output optical system for directing laser light to an optical disc (refer to Japanese Patent Application Laid-Open Publication No. 2003-257069).

The aberration correction lens is constituted by a beam expander or a collimator lens, which is displaceable along the optical axis direction and can be driven by an actuator, and is displaced so as to minimize spherical aberration that occurs in laser light focused on a signal layer of an optical disc through a cover layer (a transparent substrate) covering the signal layer.

In the case of the Blu-ray standard, NA of the objective lens is 0.85, which is much greater than 0.6 for DVD and 0.45 for CD. The outer shape of the optical pickup, restrictions in optical design due to the increase in the number of optical components for improvements in recording density and signal recording qualities, and restrictions from characteristics of the objective lens actuator limit the choice of an objective lens such that the diameter of the objective lens cannot be too large, and thus its focus distance becomes smaller. Hence, the distance from the objective lens to an optical disc is short and thus, working distance in the focusing direction of the objective lens is short.

In the case where with a single optical pickup, conventional DVD and CD standard discs as well as Blu-ray standard discs are dealt with, a single objective lens preferably deals with optical discs of each standard in terms of configuration. However, with such an optical pickup having a single objective lens mounted, because of the difference in thickness of the cover layer covering the signal layer of optical discs, namely, 0.1 mm for the Blu-ray standard, 0.6 mm for DVD and 1.2 mm for CD, working distance in the focusing direction of the objective lens becomes even shorter.

Optical disc apparatuses which optically reproduce and/or record a signal from and onto optical discs using laser light comprise a focus servo apparatus which moves focus position of the laser light directed to the signal layer of an optical disc from the optical pickup along the focusing direction in a focus search operation, thereby bringing the focus position into a focus servo area.

In order to move focus position of the laser light from the optical pickup along the focusing direction, the optical pickup usually comprises a lens holder having an objective lens mounted and elastically supported to be displaceable along two directions orthogonal to each other including the optical axis direction, and an objective lens driver for driving the lens holder by electromagnetic force. The focus servo apparatus operates the objective lens driver to drive the lens holder, thereby displacing the objective lens along the optical axis direction for achieving the focus search operation (refer to Japanese Patent Application Laid-Open Publication No. 2004-273023).

In the focus search operation of displacing the objective lens along the optical axis direction, the objective lens may collide with the optical disc depending on the working distance of the objective lens. In particular, optical pickups for optical discs of the Blu-ray standard have a greater risk that the objective lens may collide with the optical disc because the working distance of the objective lens is shorter.

Harmful rotational force about a direction orthogonal to the optical axis of the objective lens may occur due to imbalance in the weight of the lens holder, so that the lens holder is tilted and displaced. In this case, a side of the lens holder gets closer to the optical disc, and thus the risk that the lens holder may collide with the optical disc becomes greater.

Hence, conventionally the lens holder is provided with a protection member protruding closer to the optical disc than the other part and opposite the optical disc, which member is made of a material softer than that of the optical disc cover layer, in order to protect the optical disc and the objective lens by the protection member colliding with the optical disc.

However, the protection member may need to be provided as a separate part because of its material and installation position, or appropriate installation position may not be able to be secured. In addition, when colliding, the material from the protection member may stick to the optical disc.

That is, to protect the optical disc and the objective lens with the protection member does not provide an essential solution.

Meanwhile, there is a method of preventing an objective lens from colliding with an optical disc by electrically controlling and restricting the swing distance by which the objective lens is driven along the focusing direction in the focus search operation. However, it is expected that with the method using the electrical control, the lens holder will tilt or that the objective lens cannot be prevented from colliding with the optical disc due to variation in the restricted swing distance range, or the swing distance of the objective lens may not be enough to reach the focus servo area in the focus search operation. Accordingly, it is difficult to decide control settings such as the restricted swing distance range of the objective lens.

SUMMARY OF THE INVENTION

According to one aspect of the present invention, there is provided a focus servo apparatus which comprises the optical pickup having a power lens that changes an incidence angle of laser light incident on the objective lens and a power lens actuator that drives the power lens along an optical axis direction. In a focus search operation, the focus servo apparatus controls the power lens actuator to drive the power lens along the optical axis direction and detects having been brought into the focus servo area on the basis of a focus error signal obtained from photo-reception outputs from a photo-detector of the optical pickup, and then allows a focus servo to be in lock and returns the power lens to its initial position with driving the objective lens so as to maintain the lock state.

According to the present invention, the bringing-in of a focus servo is performed by driving the power lens, and after a focus servo is brought in, the objective lens is displaced. Hence, even if working distance in the focusing direction of the objective lens is short, the bringing-in of a focus servo is reliably performed, and the objective lens and a lens holder are reliably prevented from colliding with the optical disc.

Furthermore, an aberration correction lens provided in the optical pickup is used as the power lens, and thus without a need for an additional lens and lens actuator, it is convenient.

In this case, since the aberration correction lens is returned to the initial position with driving the objective lens so as to maintain the focus servo lock state, after a focus servo gets in lock, the aberration correction lens can be used for an original purpose.

Moreover, both a focus search operation which drives the power lens and a focus search operation which drives the objective lens as in the prior art can be performed, thus having greater degrees of freedom.

In this case, since the lens driven in the focus search operation is selected depending on the detected type of signal recording medium, even if the distance between the objective lens and a surface of the cover layer of the optical disc when focused in the signal layer varies depending on the NA of the objective lens and the distance between the objective lens and the cover layer covering the signal layer, the objective lens is prevented from colliding with the signal recording medium by use of the focus search operation which drives the power lens if this distance is short, and if a certain amount of the distance is secured, reliability is raised by use of the focus search operation which drives the objective lens.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<Implementation 1>

Figure 1:
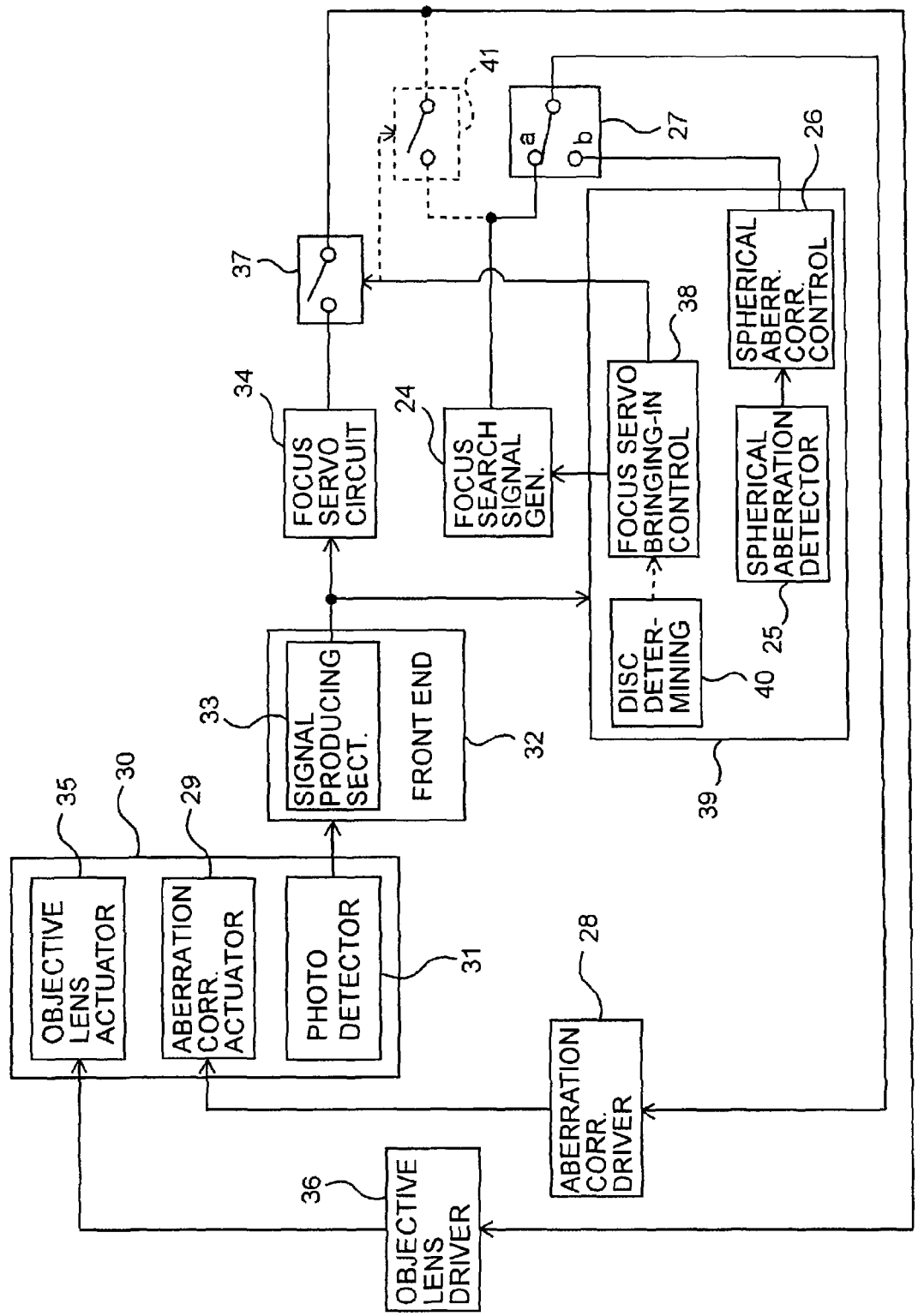
FIG. 1 is a circuit block diagram illustrating an implementation of a focus servo apparatus according to the present invention.
Figure 2:
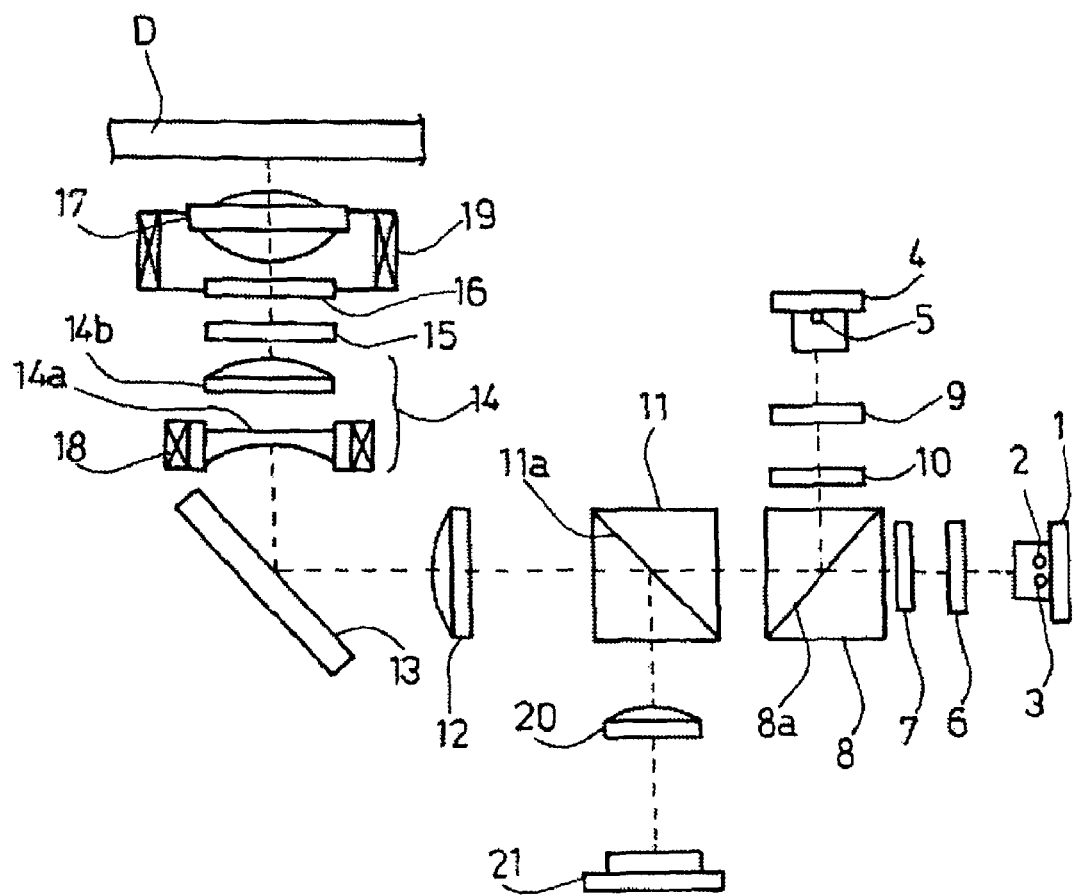
FIG. 2 is an optical arrangement diagram illustrating an example of an optical pickup used in the focus servo apparatus of FIG. 1.
Figure 3:
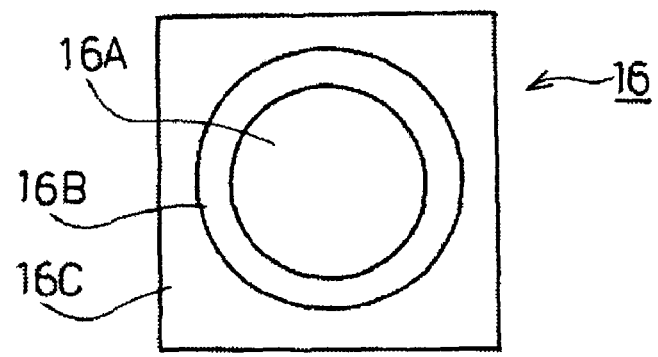
FIG. 3 is a diagram for explaining the shape of a first area 16A, a second area 16B, and a third area 16C formed on a hologram element 16.

FIG. 1 is a circuit block diagram illustrating an implementation of a focus servo apparatus according to the present invention, and FIG. 2 is an optical arrangement diagram illustrating an example of an optical pickup used in the focus servo apparatus of FIG. 1. The optical pickup of FIG. 2 is configured to deal with optical discs of CD, DVD and the Blu-ray standard.

A first laser unit 1 is constituted by a laser diode having on the same semiconductor substrate a first emission point 2 that emits laser light of a first wavelength, e.g., 780 nm in an infrared wavelength band of 765 to 805 nm suitable for CD and a second emission point 3 that emits laser light of a second wavelength, e.g., 650 nm in a red wavelength band of 645 to 675 nm suitable for DVD. The single laser unit emits laser lights of two wavelengths suitable for CD record/playback and DVD record/playback.

A second laser unit 4 is constituted by a laser diode having a third emission point 5 that emits laser light of a third wavelength, e.g., 405 nm in a blue-violet (blue) wavelength band of 400 to 420 nm suitable for optical discs of the Blu-ray standard.

Laser lights of the first and second wavelengths emitted from the first and second emission points 2 and 3 of the first laser unit 1 are each diffracted by a diffraction grating 6 to produce the ± first order of diffracted lights to be used in tracking control, then adjusted in polarization direction by a half-wave plate 7, and supplied to a dichroic prism 8 in a transmitting direction for a filter surface 8a thereof.

Meanwhile, laser light of the third wavelength emitted from the third emission point 5 of the second laser unit 4 is diffracted by a diffraction grating 9 to produce the ± first order of diffracted lights to be used in tracking control, then adjusted in polarization direction by a half-wave plate 10, and supplied to the dichroic prism 8 in a reflecting direction for the filter surface 8a.

The dichroic prism 8 is for disposing the first laser unit 1 and the second laser unit 4 in separate optical paths, and the filter surface 8a of the dichroic prism 8 is coated with a wavelength-selectable, reflecting/transmitting coat having a transmittance of no less than 95% for the laser lights of 650 and 780 nm and a transmittance of less than 5%, that is, a reflectance of no less than 95% for the laser light of 405 nm.

Hence, the laser lights of the first and second wavelengths emitted from the first laser unit 1 pass through the filter surface 8a of the dichroic prism 8 and are incident on a polarized beam splitter 11. Meanwhile, the laser light of the third wavelength emitted from the second laser unit 4 is reflected by the filter surface 8a of the dichroic prism 8 and incident on the polarized beam splitter 11.

Here, the laser lights of the first, second, and third wavelengths are adjusted by the half-wave plates 7 and 10 to be p-polarized at a polarized filter surface 11a of the polarized beam splitter 11, thus passing through the polarized filter surface 11a.

The laser lights from the first and second laser units 1 and 4 having passed through the polarized filter surface 11a of the polarized beam splitter 11 are each caused to become parallel light by a collimator lens 12 and reflected by a reflection mirror 13 such that their optical axis is bent at a right angle.

The laser light reflected by the reflection mirror 13 passes through a beam expander 14 and a quarter-wave plate 15, goes through a hologram element 16, and is incident on an objective lens 17, which focuses and irradiates it onto an optical disc D.

The beam expander 14 is constituted by a combination of a concave lens 14a and a convex lens 14b, and the concave lens 14a is displaceable along the optical axis direction and can be driven by an aberration correction actuator 18. The concave lens 14a is displaced so as to adjust the angles of the laser light rays incident on the objective lens 17, thereby introducing spherical aberration for correction in the laser light coming out of the objective lens 17 and minimizing spherical aberration that occurs in the laser light focused in the signal layer of the optical disc D through the cover layer (a transparent substrate) covering the signal layer. The beam expander 14 is a spherical aberration correction lens for correcting spherical aberration that occurs in the laser light focused in the signal layer of the signal recording medium, and the concave lens 14a and the convex lens 14b of the beam expander 14 are a power lens (incidence angle changing lens) capable of causing rays of the laser light to diverge or converge. The power lens of claim 1 particularly corresponds to the concave lens 14a that can be driven by the aberration correction actuator 18 (an incidence angle changing lens actuator).

The hologram element 16 is aperture setting means that sets the diameter of the laser light incident on the objective lens 17, and a first area 16A, a second area 16B, and a third area 16C are formed concentrically with the optical axis as the center, from the inner circumference to the outer circumference. The first area 16A is constituted by a diffraction grating having a transmittance of 95% or greater to the laser lights of the first, second, and third wavelengths; the second area 16B is constituted by a diffraction grating (or a wavelength-selectable dichroic filter film) having a transmittance of 95% or greater to the laser lights of the second and third wavelengths and a transmittance of 5% or less to the zero order of the laser light of the first wavelength due to diffraction (or reflection); and the third area 16C is constituted by a diffraction grating (or a wavelength-selectable dichroic filter film) having a transmittance of 95% or greater to the laser light of the third wavelength and a transmittance of 5% or less to the zero order of the laser lights of the first and second wavelengths due to diffraction (or reflection).

In this optical system, laser light of the first wavelength for CD and laser light of the second wavelength for DVD emitted from the first and second emission points 2, 3 of the first laser unit 1 and laser light of the third wavelength for Blu-ray Disc emitted from the third emission point 5 of the second laser unit 4 are incident on the single objective lens 17 and then focused and irradiated onto a given signal track in the signal layer of the optical disc D by an objective lens actuator 19 driving the objective lens 17 along the focusing and tracking directions.

A diffraction grating (not shown) suitable for wavelengths and NAs for CD, DVD, and Blu-ray Disc is formed on the incidence surface of the objective lens 17. When laser light of the first wavelength for CD emitted from the first emission point 2 of the first laser unit 1 is made incident on a predetermined area of the diffraction grating at a predetermined divergence angle, the objective lens 17 achieves such a characteristic as to produce an aberration-corrected laser spot having an NA suitable for record/playback of CDs, and when laser light of the second wavelength for DVD emitted from the second emission point 3 of the first laser unit 1 or laser light of the third wavelength for Blu-ray Disc emitted from the third emission point 5 of the second laser unit 4 is made incident on a predetermined area of the diffraction grating in parallel light, the objective lens 17 achieves such a characteristic as to produce an aberration-corrected laser spot having an NA suitable for record/playback of DVDs or Blu-ray Discs.

The laser light modulated and reflected by the signal layer of the optical disc D returns to the objective lens 17 and back through the same optical path and reaches the polarized beam splitter 11. The laser light reaching the polarized beam splitter 11 has passed through the quarter-wave plate 15 twice, in the forward and backward paths, and hence has its polarization direction rotated through 90°, and the laser light that was p-polarized in the forward path to the optical disc D becomes s-polarized and is incident on the polarized beam splitter 11.

The laser light returned to the polarized beam splitter 11 with a focus error component of the laser light irradiated onto the optical disc D is reflected by the polarized filter surface 11a and directed to a photo-detector 21 through a servo lens 20 performing focus adjustment. The photo-detector 21 has formed thereon a CD photo-receiver used for CD record/playback (not shown), a DVD photo-receiver used for DVD record/playback (not shown), and a Blu-ray Disc photo-receiver used for Blu-ray Disc record/playback (not shown). Laser light of the first wavelength for CD is received by light receiving sections of the CD photo-receiver; laser light of the second wavelength for DVD is received by light receiving sections of the DVD photo-receiver; and laser light of the third wavelength for Blu-ray Disc is received by light receiving sections of the Blu-ray Disc photo-receiver.

Thereby, a record signal for each type of optical disc is obtained and in addition, control signals used in focus control, tracking control and tilt control for each type of optical disc are obtained.

Next, the focus servo apparatus using an optical pickup having an aberration correction lens (which corresponds to the beam expander 14 of FIG. 2) as above will be described with reference to FIG. 1.

The aberration correction lens (or one lens forming it, which corresponds to the concave lens 14a of the beam expander 14) of the optical pickup 30 is supported so as to be displaceable along the optical axis direction and is displaced by an aberration correction actuator 29 (which corresponds to the aberration correction actuator 18 of FIG. 2) driven by an aberration correction lens driver 28.

A spherical aberration detector 25 detects the amount of spherical aberration that occurs in laser light focused on the optical disc signal layer based on various error signals of the optical pickup described later and generates an aberration correction control signal to produce an equal amount of aberration, opposite in polarity, to the detected amount of spherical aberration so as to correct the spherical aberration, and controls the aberration correction lens driver 28 via this aberration correction control signal, which is selectively supplied to the aberration correction lens driver 28 via a selection switch 27.

The selection switch 27 selectively supplies the aberration correction control signal and a focus search signal generated by a focus search signal generator 24 to the aberration correction lens driver 28. The focus search signal generated by the focus search signal generator 24 is a signal that forcibly moves the focal point of the laser light output from the optical pickup 30 along the optical axis direction and is, for example, a triangular wave signal.

When a photo-detector 31 of the optical pickup 30 (which corresponds to the photo-detector 21 of FIG. 2) receives reflected light from the optical disc, photo-reception outputs are obtained from the light receiving sections of corresponding one from among the photo-receivers of the photo-detector 31 for the types of optical discs.

These photo-reception outputs are supplied to a front end processor 32, which equalizes them, and a signal producing section 33 of the front end processor 32 performs predetermined computations to produce an RF signal (Radio Frequency signal) corresponding to recorded marks (pits and lands) of the optical disc, a focus error signal (FE signal)

indicating deviation between the focal point of laser light irradiated on the optical disc and the signal layer, a tracking error signal (TE signal) indicating deviation between the laser light and a signal track, and a tilt error signal indicating a radial tilt with respect to the signal layer.

Here, for the CD format, an astigmatic method is used to produce the focus error signal, and a three-beam method is used to produce the tracking error signal. For the DVD and Blu-ray Disc formats, the astigmatic method is used for focus control, and a differential push-pull method or a phase difference method is used for tracking control depending on the type of optical disc (ROM, R, RW, or RAM). The signal producing section 33 performs computations according to these methods.

The FE signal produced by the signal producing section 33 is supplied to a focus servo circuit 34, which generates a focus control signal to control an objective lens driver 36 that drives an objective lens actuator 35 (which corresponds to the objective lens actuator 19 of FIG. 2) so as to focus the laser light output from the optical pickup 30 onto the signal layer.

The focus control signal generated by the focus servo circuit 34 is selectively supplied to the objective lens driver 36 via a servo loop switch 37, which is controlled by a focus servo bringing-in controller 38 to be open before a focus servo is brought in and closed after having been brought in.

The focus servo bringing-in controller 38 detects that the focal point of the laser light output from the optical pickup 30 is brought into a focus servo area on the basis of the FE signal produced by the signal producing section 33, and thereby the servo loop switch 37 is closed so that the focus control signal is supplied from the focus servo circuit 34 to the objective lens driver 36.

At almost the same time when switching to a focus servo state by the focus servo bringing-in controller 38 closing the servo loop switch 37, the selection switch 27 is switched to its b-terminal and an aberration correction signal generated by a spherical aberration correction controller 26 is supplied to the aberration correction lens driver 28.

Note that the focus servo bringing-in controller 38 and the spherical aberration detector 25 are incorporated in a CPU 39 (a controller) for controlling the bringing-in of a focus servo according to a predetermined process procedure.

Figure 4:
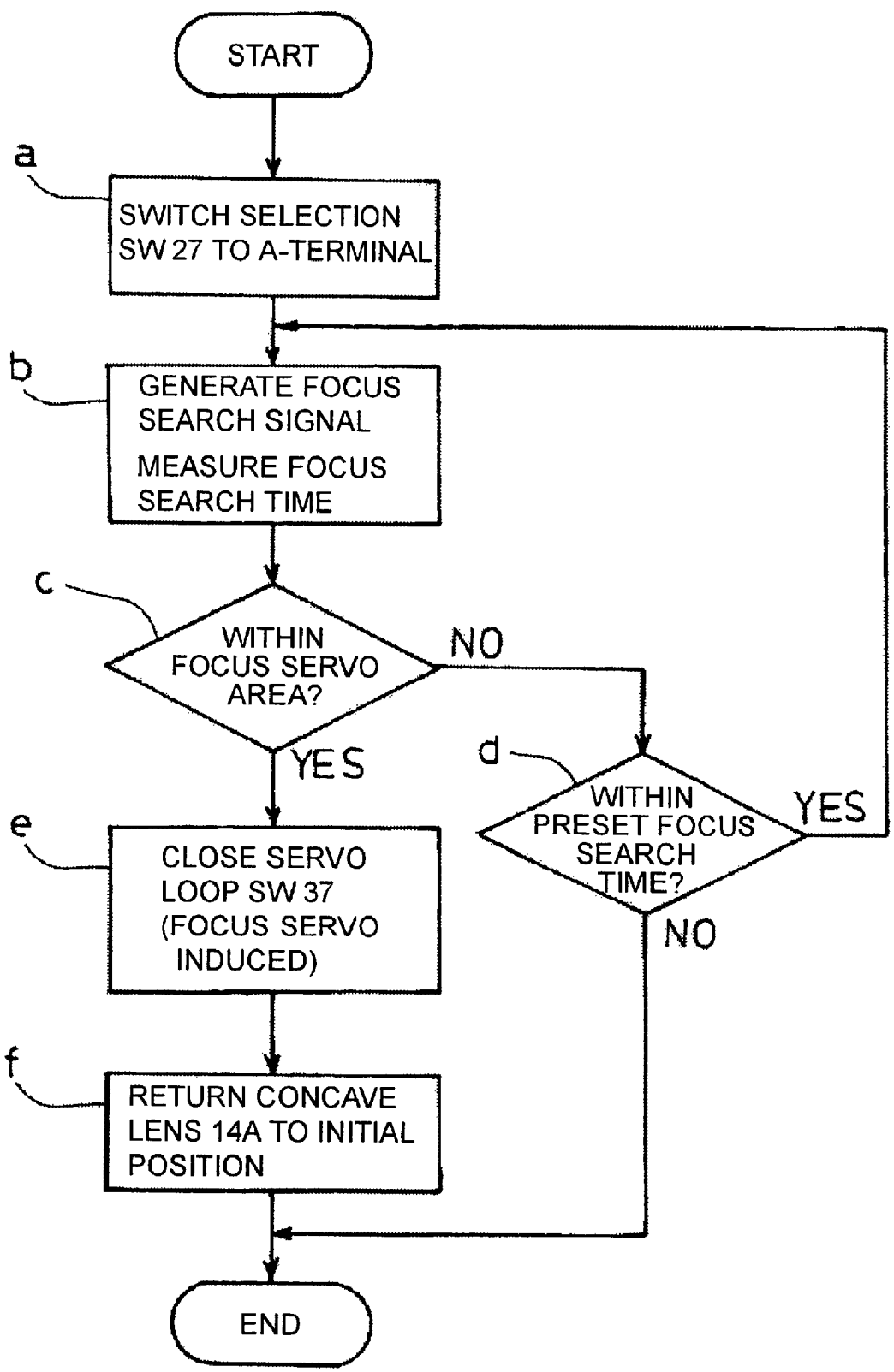
FIG. 4 is a flow chart showing a focus servo bringing-in method in the focus servo apparatus of FIG. 1.

With the focus servo apparatus having this configuration, a focus servo bringing-in method is as shown in the flow chart of FIG. 4.

In performing the bringing-in of a focus servo, the selection switch 27 is switched to its a-terminal to select the focus search signal generated by the focus search signal generator 24 (step a). Then, the focus search signal generator 24 generates the focus search signal, which is supplied to the aberration correction lens driver 28 and by which the concave lens 14a of the beam expander 14 is driven along the optical axis direction, thereby starting a focus search operation. At the same time, a timer in the CPU 39 starts counting thus performing time measurement for the focus search operation (step b).

Figure 5:
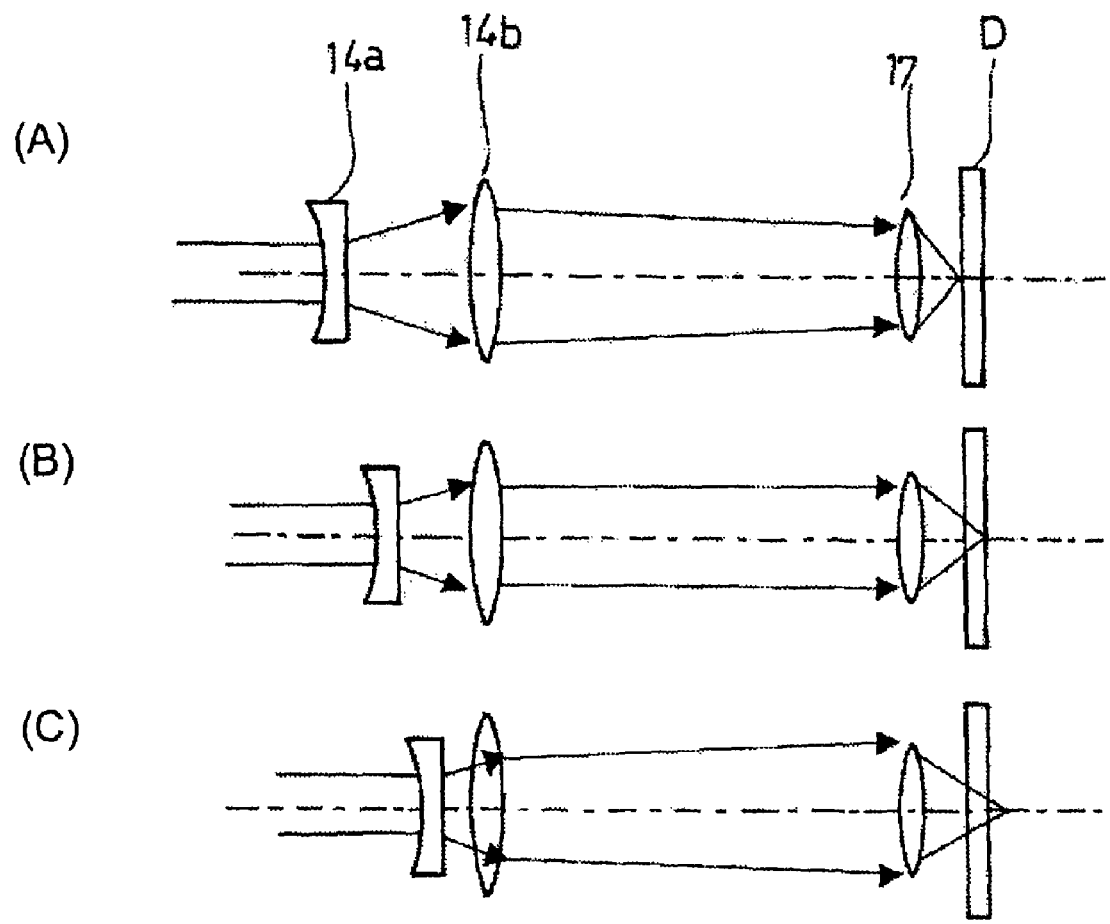
FIG. 5 is a diagram for explaining a focus search operation which drives a concave lens 14a of a beam expander 14.

Here, when the concave lens 14a of the beam expander 14 is driven along the optical axis direction, as shown in (A) to (C) of FIG. 5, as the concave lens 14a is displaced, the angles of laser light rays incident on the objective lens 17 change. Hence, the focal point of the laser light output from the objective lens 17 is displaced thereby performing the focus search operation.

After the focus search operation starts, the focus servo bringing-in controller 38 detects whether the FE signal produced by the signal producing section 33 is at 0, thereby determining whether the focal point of the laser light from the optical pickup 30 is brought into the focus servo area (step c).

If it is determined that the focal point of the laser light from the optical pickup 30 is not brought into the focus servo area, then it is determined whether the time count by the timer is within a predetermined focus search period of time (step d). If within the period of time, the focus search signal continues to be supplied to the aberration correction lens driver 28, thereby continuing the focus search until it is determined that the focal point of the laser light from the optical pickup 30 is brought into the focus servo area or that the time count is over the predetermined focus search period of time.

On the other hand, if it is determined that the focal point of the laser light from the optical pickup 30 is brought into the focus servo area, then the servo loop switch 37 open in the focus search is closed so that the focus control signal is supplied from the focus servo circuit 34 to the objective lens driver 36 (step e). The focus servo circuit 34 generates the focus control signal based on the FE signal produced by the signal producing section 33, and supplies the focus control signal to the objective lens driver 36 thereby allowing the optical pickup to be in a focus servo state where the objective lens actuator 35 drives the objective lens 17 such that the FE signal stays at zero and so as to control the laser light output from the optical pickup 30 to be focused in the signal layer of the optical disc D.

After switching to the focus servo state, the focus search signal generator 24 is stopped from generating the focus search signal, and the selection switch 27 is switched to its b-terminal to select the aberration correction signal generated by the spherical aberration correction controller 26. In the beginning after switching to the focus servo state, the spherical aberration correction controller 26 generates a control signal to return the concave lens 14a of the beam expander 14 to its initial position, and thus the concave lens 14a is returned to the initial position (step f). This initial position can be detected from the state of, for example, a photoelectric or mechanical switch.

When returning the concave lens 14a to the initial position, since in the focus servo state, the objective lens actuator 35 is driven by the focus control signal from the focus servo circuit 34 so as to displace the objective lens 17 to cancel out the displacement of the focal point of the laser light output from the optical pickup 30 due to the displacement of the concave lens 14a. That is, when the concave lens 14a is returned to the initial position, the objective lens 17 is displaced to maintain the focus servo state.

Therefore, even if the objective lens 17 is displaced, the objective lens 17 is prevented from colliding with the surface of the optical disc D.

When the concave lens 14a is returned to the initial position, the spherical aberration correction controller 26 generates the aberration correction control signal to correct the spherical aberration based on the amount of spherical aberration in the laser light detected by the spherical aberration detector 25. The concave lens 14a is driven by the aberration correction actuator 29 according to the aberration correction control signal to be displaced to such a position as to correct spherical aberration that occurs in the laser light focused on the optical disc signal layer.

Although in this implementation, the focus search is performed by driving the concave lens 14a of the beam expander 14 along the optical axis direction, the convex lens 14b may be used if it can be driven. Not being limited to the beam expander 14, if a power lens capable of causing rays of the laser light to diverge or converge such as a collimator lens or a coupling lens can be driven along the optical axis direction, the focus search can be performed using the power lens.

<Implementation 2>

A circuit having added thereto signal paths indicated by broken lines in the circuit block diagram of FIG. 1 is a focus servo apparatus different from the above implementation.

That is, a signal path is added through which a switch 41 selectively supplies the focus search signal generated by the focus search signal generator 24 to the objective lens driver 36. The switch 41 and the selection switch 27 are switched depending on the type of optical disc that is detected by an optical disc determining circuit 40 incorporated in the CPU 39.

With this configuration, either the concave lens 14a of the beam expander 14 or the objective lens 17 is selected as the lens driven in the focus search depending on the determined type of optical disc, i.e., CD, DVD, or Blu-ray Disc. For Blu-ray Disc for which the working distance of the objective lens 17 is not enough for the focus search, the concave lens 14a is driven in the focus search, while for CD and DVD for which the working distance of the objective lens 17 is enough for the focus search, the objective lens 17 is driven in the focus search as in the prior art.

As such, where the optical disc determining circuit 40 has detected a Blu-ray Disc, in order to bring in a focus servo, the focus servo bringing-in controller 38 switches the selection switch 27 to its a-terminal to select the focus search signal generated by the focus search signal generator 24, and the switch 41 is opened. Thus, the focus search is performed in which the concave lens 14a of the beam expander 14 is driven along the focusing direction as in implementation 1.

After the focal point is brought into the focus servo area, the servo loop switch 37 is closed switching to the focus servo state. Thereafter, the same operation as in implementation 1 is performed.

On the other hand, where the disc determining circuit 40 has determined that the optical disc is other than a Blu-ray Disc, in order to bring in a focus servo, the focus servo bringing-in controller 38 switches the selection switch 27 to its b-terminal to select the aberration correction signal generated by the spherical aberration correction controller 26, and the switch 41 is closed. Thus, the conventional focus search is performed in which the objective lens 17 is driven along the focusing direction. In this case, during the focus search, the spherical aberration correction controller 26 is stopped from generating the aberration correction signal and the concave lens 14a of the beam expander 14 is stopped in its initial position.

After the focal point is brought into the focus servo area, the servo loop switch 37 is closed switching to the focus servo state. At the same time, the switch 41 is opened. Thereafter, the spherical aberration correction controller 26 generates the aberration correction signal, and the concave lens 14a is driven according to the aberration correction signal to correct spherical aberration that occurs in the laser light focused on the optical disc signal layer.

Although the preferred implementations of the present invention have been described, the above implementations are provided to facilitate the understanding of the present invention and not intended to limit the present invention. It should be understood that various changes and alterations can be made therein without departing from spirit and scope of the invention and that the present invention includes its equivalents.

What is claimed is:

1. A focus servo apparatus which performs a focus search operation of moving a focus position of laser light into a focus servo area,
    wherein the laser light is directed to a signal layer of a signal recording medium from an optical pickup apparatus having an objective lens actuator for driving an objective lens along a focusing direction,
    wherein the optical pickup apparatus has a power lens that changes an incidence angle of laser light incident on the objective lens and a power lens actuator that drives the power lens along an optical axis direction of the power lens,
    wherein, in the focus search operation, the focus servo apparatus controls the power lens actuator to drive the power lens along the optical axis direction while controlling the objective lens to remain in place, and
    wherein, upon detecting that the focus position has been brought into the focus servo area on the basis of a focus error signal obtained based on photo-reception outputs of a photo-detector of the optical pickup apparatus, the focus servo apparatus allows a focus servo to be in a lock state and returns the power lens to an initial position of the power lens while driving the objective lens so as to maintain the lock state,
    the power lens being an aberration correction lens that corrects spherical aberration caused by an output optical system of the optical pickup apparatus which directs the laser light to the signal recording medium, and
    the focus servo apparatus being configured to switch from driving the aberration correction lens according to the focus search operation to driving the aberration correction lens according to a spherical aberration correction signal for adjusting an amount by which to correct the spherical aberration by displacing the aberration correction lens along the optical axis direction when the focus servo is in the lock state.

2. The focus servo apparatus according to claim 1, wherein the initial position to which the aberration correction lens is returned when the focus servo is in the lock state minimizes spherical aberration occurring in the laser light focused on the signal layer of the signal recording medium through a cover layer covering the signal layer.

3. The focus servo apparatus according to claim 1, wherein the aberration correction lens is a beam expander.

4. The focus servo apparatus according to claim 1, wherein a focus search signal for the focus search operation is selectively supplied to an objective lens driver driving the objective lens actuator and a power lens driver driving the power lens actuator.

5. The focus servo apparatus according to claim 4, wherein the focus servo apparatus is compatible with plural formats of signal recording media each having a different thickness of a cover layer covering the signal layer thereof, and supplies the focus search signal to either the objective lens driver or the power lens driver depending on a detected type of signal recording medium.

6. A focus servo apparatus comprising:
    an objective lens actuator that drives an objective lens relative to a signal layer of a signal recording medium;
    an incidence angle changing lens actuator that drives an incidence angle changing lens capable of changing an incidence angle of laser light to the objective lens along an optical axis direction of the laser light;
    a photo-detector that receives light reflected from the signal recording medium; and a controller that:
  controls the incidence angle changing lens actuator to move a focal point of the laser light along the optical axis direction while controlling the objective lens to remain in place,
  when detecting that a focus error signal generated based on photo-reception outputs of the photo-detector is at a predetermined value during the control of the incidence angle changing lens actuator, controls the objective lens actuator to cause the laser light to focus on the signal layer of the signal recording medium while returning the incidence angle changing lens to an initial position of the incidence angle changing lens, and
  after return to the initial position of the incidence angle changing lens, controls the incidence angle changing lens actuator to correct spherical aberration of the laser light focused on the signal layer.

7. The focus servo apparatus according to claim 6, wherein the incidence angle changing lens is a spherical aberration correction lens displaceable along the optical axis direction opposite the signal recording medium by the objective lens to correct spherical aberration of the laser light that is converged on the signal layer.

8. The focus servo apparatus according to claim 7, wherein the spherical aberration correction lens comprises a concave lens in a beam expander.

9. The focus servo apparatus according to claim 6, wherein the initial position minimizes spherical aberration of the laser light focused on the signal layer.

10. A focus servo apparatus comprising:
  an objective lens actuator that drives an objective lens relative to a signal layer of an optical disc;
  an incidence angle changing lens actuator that drives an incidence angle changing lens capable of changing an incidence angle of laser light to the objective lens along an optical axis direction of the laser light;
  a photo-detector that receives light reflected from the optical disc;
  a disc determining unit that determines whether a thickness of a cover layer covering the signal layer of the optical disc is greater than a predetermined value; and
  a controller that, if the disc determining unit determines that the thickness of the cover layer is less than the predetermined value, controls the incidence angle changing lens actuator to move a focal point of the laser light along the optical axis direction while controlling the objective lens to remain in place and, when detecting that a focus error signal generated based on photo-reception outputs of the photo-detector is at another predetermined value during the control of the incidence angle changing lens actuator, controls the incidence angle changing lens actuator and the objective lens actuator so as to cause the laser light to focus on the signal layer while returning the incidence angle changing lens to an initial position and, upon return of the incidence angle changing lens to the initial position, controls the incidence angle changing lens to correct spherical aberration of the laser light focused on the signal layer, and
  if the disc determining unit determines that the thickness of the cover layer is greater than the predetermined value, controls the objective lens actuator to move a focal point of the laser light along the optical axis direction and, when detecting that the focus error signal generated based on photo-reception outputs of the photo-detector is at the other predetermined value during the control of the objective lens actuator, controls the objective lens actuator so as to cause the laser light to focus on the signal layer.

11. The focus servo apparatus according to claim 10, wherein the incidence angle changing lens is a spherical aberration correction lens displaceable along the optical axis direction opposite the optical disc by the objective lens to correct spherical aberration of the laser light that is converged on the signal layer.

12. The focus servo apparatus according to claim 11, wherein the spherical aberration correction lens is a beam expander having a convex lens and a concave lens.

13. The focus servo apparatus according to claim 10, wherein the initial position minimizes spherical aberration of the laser light focused on the signal layer.

14. A method comprising:
  driving a power lens along an optical axis direction, starting from an initial position, while controlling an objective lens to remain in place;
  detecting, when driving the power lens along the optical axis direction and controlling the objective lens to remain in place, that a focal point of laser light passing through the objective lens has been brought into a focus servo area;
  when detecting that the focal point of the laser light passing through the objective lens has been brought into the focus servo area, driving the power lens along the optical axis direction to return to the initial position, while driving the objective lens along the optical axis direction to maintain the focal point of the laser light within the focus servo area;
  detecting that the power lens has returned to the initial position; and
  when detecting that the power lens has returned to the initial position, controlling the power lens to correct spherical aberration occurring in the laser light.

* * * * *